United States Patent
Her et al.

[19]

[11] Patent Number: 5,900,124
[45] Date of Patent: May 4, 1999

[54] METHOD AND APPARATUS OF CONCENTRATING CHEMICALS FOR SEMICONDUCTOR DEVICE MANUFACTURING

[75] Inventors: Yong-woo Her, Yongin; Heoung-bin Kim, Songnam; Bok-soon Ko, Yongin; Byoung-woo Son, Suwon, all of Rep. of Korea

[73] Assignee: Samsung Electronics Co., Ltd., Suwon, Rep. of Korea

[21] Appl. No.: 08/842,276

[22] Filed: Apr. 24, 1997

[30] Foreign Application Priority Data

Jun. 25, 1996 [KR] Rep. of Korea ................. 1996-23546

[51] Int. Cl.[6] ............................... B01D 1/14; B01D 3/00
[52] U.S. Cl. ..................... 203/49; 159/16.1; 159/26.2; 159/DIG. 6; 159/DIG. 15; 159/DIG. 21; 159/DIG. 35; 202/267.1; 202/266; 203/86; 203/100
[58] Field of Search ................. 203/49, 86, 100; 159/26.2, DIG. 6, DIG. 35, 16.1, 47.1, DIG. 21, DIG. 15; 202/185.1, 266, 267.1

[56] References Cited

U.S. PATENT DOCUMENTS

| | | | |
|---|---|---|---|
| 4,223,448 | 9/1980 | Saito et al. | 34/12 |
| 4,347,216 | 8/1982 | Kawasaki et al. | 422/78 |
| 4,950,358 | 8/1990 | Ahlgren | 156/610 |
| 5,099,557 | 3/1992 | Engelsberg | 29/25.01 |
| 5,327,779 | 7/1994 | Sanders et al. | 73/64.45 |
| 5,403,434 | 4/1995 | Moslehi | 156/643 |
| 5,428,990 | 7/1995 | Ohmi | 73/64.48 |
| 5,470,799 | 11/1995 | Hoh et al. | 437/238 |
| 5,686,656 | 11/1997 | Amirow et al. | 73/23.35 |

FOREIGN PATENT DOCUMENTS 1189558 7/1989 Japan.

OTHER PUBLICATIONS

Edwin C. Kuehner et al., "Production and Analysis of Special High–Purity Acids Purified by Sub–Boiling Distillation", *Journal of Analytical Chemistry*, vol. 44, No. 12, p. 2050 (1972).

*Primary Examiner*—Virgiinia Manoharan
*Attorney, Agent, or Firm*—Jones, Volentine, Steinberg & Whitt, L.L.P.

[57] ABSTRACT

A method of concentrating chemicals for semiconductor devices, which includes the steps of heating a sample container by using a high-energy light source, vaporizing the chemicals by injecting a high-temperature gas into the sample container through an injection opening in the sample container and discharging the vaporized chemicals by the pressure of the gas through a gas outlet formed on the sample container. An apparatus of concentrating chemicals for semiconductor devices includes a sample container having a sample-supply window, a gas-injection opening and a gas outlet. A high-energy light source heats the sample container and a gas-supply source supplies the gas through a gas-injection opening in the sample container. A gas-heating device located between the sample container and the gas-supply source heats the gas provided by the gas-supply source.

11 Claims, 1 Drawing Sheet

METHOD AND APPARATUS OF CONCENTRATING CHEMICALS FOR SEMICONDUCTOR DEVICE MANUFACTURING

BACKGROUND OF THE INVENTION

1. Field of the Invention

The present invention relates to a method and apparatus of concentrating chemicals during semiconductor device manufacturing processes and, more particularly, to a method and apparatus of concentrating chemicals which are used during a pretreatment of a sample prior to analyzing the chemicals for a semiconductor device in a chemical analytical instrument.

2. Description of the Related Art

A micro contaminant existing in constituent layers of a semiconductor device has a greater effect on the device characteristics as the size of the device is reduced due to the higher integration of a semiconductor device. Accordingly, the goal is to remove as many of the micro contaminants as possible throughout the fabrication process of a semiconductor device. A wet cleaning process is the most typical measure taken to reduce or eliminate contamination of a wafer.

Chemicals such as fluoric acid, nitric acid, sulfuric acid and hydrogen peroxide solution, etc. are chiefly used in a wet cleaning process, and those chemicals are required to have a high degree of purity so as to prevent a wafer from being recontaminated. Therefore, it is necessary to perform a quantitative and qualitative analysis of the micro contaminants in the chemicals. Contaminants may include such heavy metals as iron(Fe), aluminum(Al) and copper(Cu), etc. and ions of sodium(Na+), ammonium($NH_4^+$), nitrate ($NO_3^-$) and chloride($Cl^-$), etc. To analyze these contaminants, analytical instruments such as a graphite reactor atomic absorption spectrometer (GFAAS), an induced coupled plasma mass spectroscope (ICP-MS) and ion chromatography (IC) are mainly used.

However, since the chemicals used in a wet cleaning process are highly pure, it is difficult to make a quantitative analysis with the usual analytical instruments due to the minimum limitations of detection.

Accordingly, to ensure an effective quantitative analysis of chemicals used for semiconductor device manufacturing, a chemical concentration method is applied to increase the relative concentrations of the micro contaminants in a matrix by vaporizing the chemicals with the contaminants and reducing the amounts of the matrix.

Well-known chemical concentration methods include isopiestic distillation, below-boiling-point distillation and vacuum distillation for attaining a highly pure acid.

Isopiestic distillation is a method of concentrating the chemicals of a sample on the basis of the difference in vapor pressures. Isopiestic distillation is applicable to the concentration of acids having a high vapor pressure, for example, hydrochloric acid, rather than acids having a low vapor pressure, for example, nitric acid and sulfuric acid. Accordingly, it is not suitable for the pretreatment of samples.

Below-boiling-point distillation is performed by a closed system comprising two heated and cooled bottles perpendicularly installed for sample-concentration. This distillation method is applicable to the concentration of fluoric acid having a low boiling point, but it is not suitable for sulfuric acid having a high boiling point.

Another below-boiling-point distillation method is disclosed in Edwin C. Kuehner et al., "Production and Analysis of Special High-Purity Acids Purified by Sub-Boiling Distillation", Journal of Analytical Chemistry, vol. 44, No. 12, p. 2050 (1972). While the method disclosed by Kuehner is suitable for a concentration of acids having a high boiling point such as sulfuric acid, it is not suitable for micro analysis because of the constructive problems of the instrument. In particular, it takes a long time to concentrate a sample and it is easy to contaminate a sample when provided to the analytical instrument.

Vacuum distillation can be used for acids having a high vapor pressure but is not applicable to micro analysis because the sample can be contaminated through the wall of a container when the container is heated.

In another method of concentrating chemicals, a quartz beaker containing a sample is placed in a Pyrex box through which nitrogen gas filtered by a HEPA filter flows. The box is heated by radiating infrared rays from above the box and setting a high-temperature plate below the box so as to concentrate the sample.

The above-described method reduces the contamination of a sample from the surrounding environment and it also reduces the danger of damaging an air cleaner by catching chemicals in a workroom. However, the method is problematic in that the sample may be lost through the wall of the beaker and the sample may be contaminated because the Pyrex or quartz beaker is directly heated.

SUMMARY OF THE INVENTION

Accordingly, the present invention is directed to a method and an apparatus of concentrating chemicals for a semiconductor device that substantially overcomes one or more of the problems due to the limitations and disadvantages of the related art.

An object of the present invention is to provide a method and an apparatus of concentrating chemicals used in semiconductor device manufacturing, where the loss of a sample can be prevented while extracting as many micro contaminants as possible from the sample, thereby preventing contamination of the environment. Such a method can be used with chemicals having a high vapor pressure which can be concentrated in a short time so as to obtain highly pure chemicals.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method of concentrating chemicals for semiconductor devices by vaporization, the method comprising the steps of: heating a sample container having chemicals disposed therein by radiating a high-energy light source at the sample container, the light source being spaced apart from the sample container; injecting a high-temperature gas into the sample container through an injection opening so as to vaporize the chemicals; and discharging and condensing the vaporized chemicals, under a pressure of the gas, through a gas outlet formed on the sample container.

In another aspect, there is provided an apparatus of concentrating chemicals for semiconductor devices, comprising: a sample container having a sample-supply window, a gas-injection opening and a gas outlet; a high-energy light source spaced apart from the sample container for heating the sample container; a gas-supply source for supplying a gas through the gas-injection opening of the sample container; and a gas-heating device arranged between the sample container and the gas-supply source, the gas-heating device heating the gas provided by the gas-supply source.

The above apparatus further comprises a condenser for condensing the gas discharged from the gas-outlet of the sample container and a chemical collector for collecting the liquid which is condensed and discharged from the condenser.

The above apparatus further comprises a support means for supporting the sample container at an angle to increase the absorption efficiency of the high energy light emitted from the light source.

The above apparatus further comprises inner walls coated with a heat reflecting layer so as to prevent a loss of energy emitted from the high-energy light source and a housing for surrounding the sample container and the high-energy light source.

According to the present invention as described above, the sample container with chemicals is heated by the light-energy radiated from a high-energy light source, a gas is provided by the gas supply source and heated in the gas-heating device, the heated gas is supplied to the inside of the sample container through the gas-injection opening thereof, and then, the vaporized chemicals are discharged by the pressure of the gas through the gas-outlet formed on the sample container and are condensed in the condenser. The condensed chemicals are collected by the chemical collector.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawing, which is included to provide a further understanding of the invention and is incorporated in and constitutes a part of this specification, illustrates an embodiment of the invention and together with the description serves to explain the principles of the invention, where:

FIG. 1 is a schematic view of an apparatus of concentrating chemicals used for semiconductor device manufacturing according to a preferred embodiment of the present invention.

DETAILED DESCRIPTION OF PREFERRED EMBODIMENT

Figure 1:
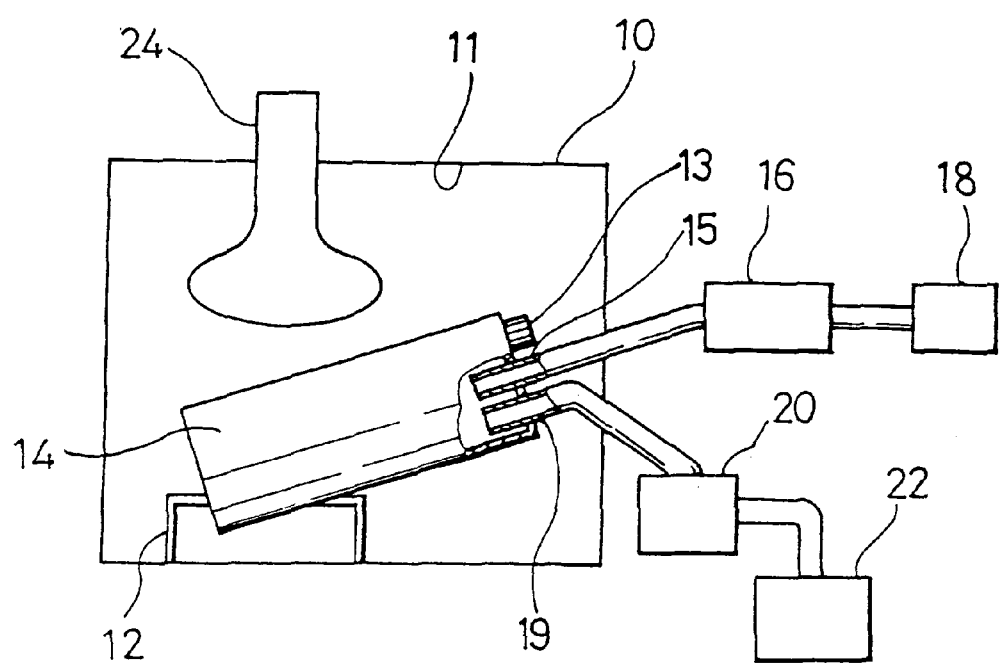

Reference will now be made in detail to the preferred embodiments of the present invention, an example of which is illustrated in the accompanying drawing.

Referring to FIG. 1, an inside wall 11 of a housing 10 is coated with a reflecting layer or layers so as to prevent the loss of heat. A support 12 is located at the bottom of the housing 10. A sample container 14, which is filled with chemicals, is placed on the support 12 at a slope of 25 to 30° so as to effectively absorb the energy emitted from a light source 24.

The sample container 14 is composed of quartz and PFA materials and has a sample-supply window 13, a gas-injection opening 15 and a gas outlet 19. The gas-injection opening 15 is connected to a gas-heating device 16 via a Teflon pipe, and the gas-heating device 16 is connected to a gas-supply source 18. Additionally, the gas outlet 19 is connected to a condenser 20 via a Teflon pipe, and the condenser 20 is connected to a chemical collector 22.

Above the sample container 14, an infrared lamp 24 for emitting a high energy light is disposed through the housing 10.

In the apparatus for concentrating chemicals according to the present invention as described above, a chemical sample is provided to the sample container 14 through the sample-supply window 13. The sample container 14 is then covered and heated to 230~250° C., which is below the sample container's 14 fusion point of 310° C., by operating the infrared lamp 24. A nitrogen gas is provided from the gas-supply source 18, is heated to about 180~200° C. in the gas-heating device 16, and then injected inside the sample container 14 through the gas-injection opening 15. Then, the vaporized chemical gas is discharged through the gas outlet 19 to the condenser 20 for condensation, and the condensed chemical gas is collected by the chemical collector 22 resulting in collection of highly pure chemicals.

In the above apparatus, the sample container 14 is constructed so as to be completely isolated from the outer environment, so that any contamination from or to the environment is excluded, to thereby obtain an optimum sample and highly pure chemicals.

Moreover, the time required for condensing the chemicals is shortened by the above apparatus because a heated nitrogen gas is used to vaporize the chemicals, which prevents the chemicals from recondensing. The micro contaminants may be extracted from the sample in larger quantities because there is no loss of the sample through the wall of the sample container 14, so that a highly pure chemical may be obtained with distillation.

It will be apparent to those skilled in the art that various modifications and variations can be made in the method and apparatus of the present invention without departing from the spirit or scope of the invention. Thus, it is intended that the present invention cover the modifications and variations of this invention within the scope of the appended claims and their equivalents.

What is claimed is:

1. A method of concentrating chemicals for semiconductor devices by vaporization, the method comprising:

supporting a sample container having chemicals disposed therein at an angle;

surrounding the sample container and a high-energy light source with a housing;

heating the sample container by radiating the sample container with the high-energy light source, the light source being spaced apart from the sample container;

injecting a high-temperature gas into said sample container through an injection opening so as to vaporize said chemicals, the high temperature gas being provided from a gas-supply source and a gas-heating device arranged between the sample container and the gas-supply source the gas-heating device heating the gas provided by the gas-supply source; and discharging and condensing the vaporized chemicals under a pressure of the gas through a gas outlet formed on the sample container.

2. The method as defined in claim 1, wherein said high-temperature gas in said injecting step is nitrogen.

3. The method as defined in claim 2, wherein the temperature of said nitrogen gas is between 180° C. and 200° C. during said injecting step.

4. The method as defined in claim 1, wherein a heating temperature of said high-energy light source is between 230° C. and 250° C. during said heating step.

5. An apparatus of concentrating chemicals for semiconductor devices, comprising:
   a sample container having a sample-supply window, a gas-injection opening and a gas outlet;
   a support which supports said sample container at an angle;
   a high-energy light source spaced apart from said sample container for heating said sample container;
   a housing which surrounds said sample container and said high-energy light source;
   a gas-supply source for supplying a gas through said gas-injection opening of the sample container; and
   a gas-heating device arranged between said sample container and said gas-supply source, said gas-heating device heating the gas provided by said gas-supply source.

6. The apparatus as defined in claim 5, further comprising a condenser for condensing the gas discharged from the gas outlet of said sample container.

7. The apparatus as defined in claim 6, further comprising a chemical collector for collecting liquid which is condensed and discharged from said condenser.

8. The apparatus as defined in claim 5, wherein said angle is between about 25 to about 30 degrees.

9. The apparatus as defined in claim 5, wherein said sample container is made of one of quartz and Teflon.

10. The apparatus as defined in claim 5, wherein said high-energy light source is an infrared lamp.

11. The apparatus as defined in claim 5, wherein an inner wall of said housing is coated with a heat reflecting layer.

* * * * *